(12) United States Patent
Brandt et al.

(10) Patent No.: US 7,871,515 B2
(45) Date of Patent: Jan. 18, 2011

(54) FILTER ASSEMBLIES, FILTER CARTRIDGES AND METHODS FOR REMOVING FILTER CARTRIDGES FROM FILTER ASSEMBLIES

(75) Inventors: Jay D. Brandt, Fort Myers, FL (US); David M. Childs, New Port Richey, FL (US)

(73) Assignee: Pall Corporation, Port Washington, NY (US)

( * ) Notice: Subject to any disclaimer, the term of this patent is extended or adjusted under 35 U.S.C. 154(b) by 1063 days.

(21) Appl. No.: 10/552,632

(22) PCT Filed: Apr. 12, 2004

(86) PCT No.: PCT/US2004/011117

§ 371 (c)(1),
(2), (4) Date: Sep. 20, 2006

(87) PCT Pub. No.: WO2004/091750

PCT Pub. Date: Oct. 28, 2004

(65) Prior Publication Data

US 2007/0158263 A1    Jul. 12, 2007

Related U.S. Application Data

(60) Provisional application No. 60/461,428, filed on Apr. 10, 2003.

(51) Int. Cl.
*B01D 29/15* (2006.01)
*B01D 29/23* (2006.01)
*B01D 35/30* (2006.01)
*B01D 35/34* (2006.01)

(52) U.S. Cl. ............... 210/232; 210/767; 210/443; 210/450; 210/457; 210/485

(58) Field of Classification Search ................. 210/232, 210/443, 450, 493.1, 767, 457, 485
See application file for complete search history.

(56) References Cited

U.S. PATENT DOCUMENTS

| | | | |
|---|---|---|---|
| 4,316,801 A | | 2/1982 | Cooper |
| 4,367,144 A | * | 1/1983 | Peters et al. ............... 210/234 |
| 4,465,595 A | | 8/1984 | Cooper |
| 4,552,662 A | | 11/1985 | Webster et al. |
| 5,543,047 A | | 8/1996 | Stoyell et al. |
| 5,695,633 A | | 12/1997 | Ernst et al. |
| 5,725,621 A | | 3/1998 | Pruette et al. |
| 5,770,054 A | * | 6/1998 | Ardes .......................... 210/130 |
| 5,770,065 A | | 6/1998 | Popoff et al. |
| 5,855,780 A | | 1/1999 | Dye et al. |
| 5,922,196 A | | 7/1999 | Baumann |
| 6,110,368 A | | 8/2000 | Hopkins et al. |
| 6,187,188 B1 | | 2/2001 | Janik et al. |

(Continued)

FOREIGN PATENT DOCUMENTS

EP    0 791 387 A1    8/1997

(Continued)

*Primary Examiner*—Thomas M Lithgow
(74) *Attorney, Agent, or Firm*—Leydig, Voit & Mayer, Ltd.

(57) ABSTRACT

A filter assembly (100) may comprise a filter cartridge (102) and a filter housing (101) which may include a cylindrical support (121) and a removable portion (110).

24 Claims, 4 Drawing Sheets

U.S. PATENT DOCUMENTS

| | | | |
|---|---|---|---|
| 6,241,885 B1 | 6/2001 | Moddemeijer | |
| 6,251,273 B1 * | 6/2001 | Jawurek et al. | 210/232 |
| 6,471,070 B2 | 10/2002 | Janik | |
| 6,506,303 B1 | 1/2003 | Gustafsson et al. | |
| 6,569,326 B1 | 5/2003 | Baumann et al. | |
| 2001/0037969 A1 | 11/2001 | Stankowski | |
| 2002/0134726 A1 | 9/2002 | Ardes | |

FOREIGN PATENT DOCUMENTS

| | | | |
|---|---|---|---|
| GB | 1516182 A * | 6/1978 | |
| GB | 2290486 A * | 1/1996 | |
| JP | 11-506699 | 6/1999 | |
| JP | 2001-512365 | 8/2001 | |
| JP | 2002-518149 | 6/2002 | |
| JP | 2003-509201 A | 3/2003 | |
| WO | WO 97/24169 | 7/1997 | |
| WO | WO 01/85304 A1 | 11/2001 | |
| WO | WO 02/100511 * | 12/2002 | |

* cited by examiner

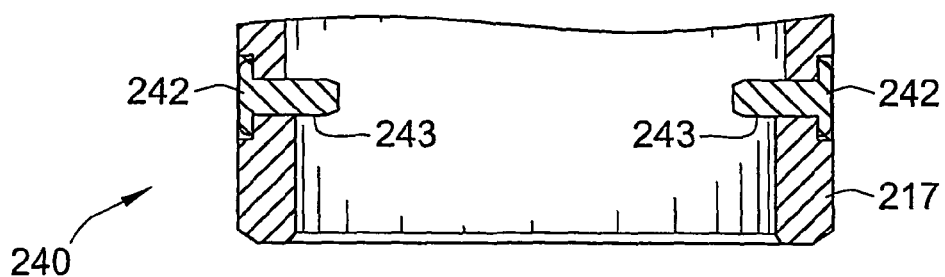
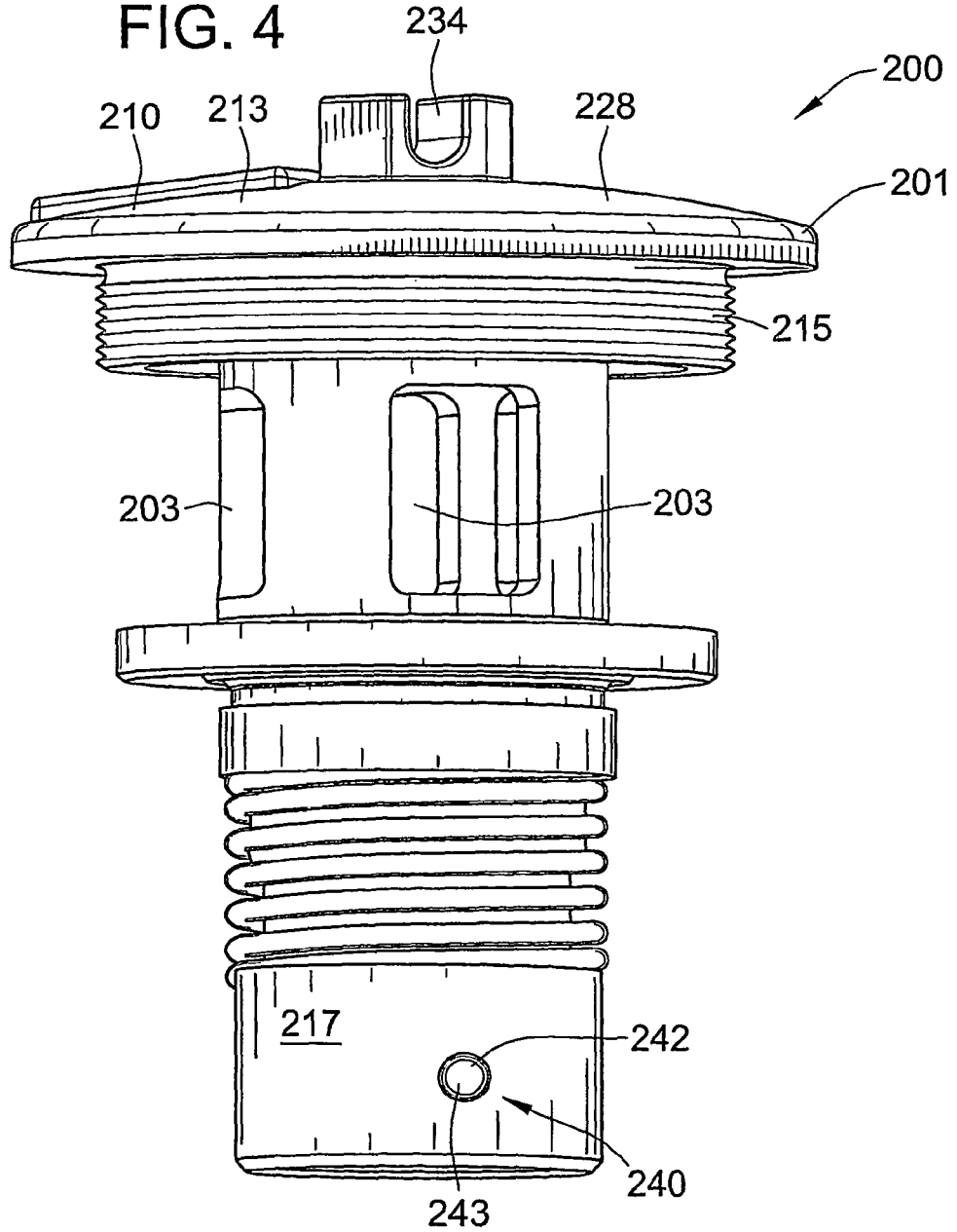

FILTER ASSEMBLIES, FILTER CARTRIDGES AND METHODS FOR REMOVING FILTER CARTRIDGES FROM FILTER ASSEMBLIES

This application is the United States national phase of International Application No. PCT/US2004/011117 which was filed on Apr. 12, 2004, and which claims the benefits of priority of U.S. Provisional Application No. 60/461,428, which was filed on Apr. 10, 2003, both of which are incorporated herein by reference.

FIELD OF THE INVENTION

The invention relates to filter assemblies and filter cartridges for separating undesirable substances from fluids, including liquids and gases. Undesirable substances which may be separated from a liquid include particulate matter, such as solid or gelatinous particles, as well as one or more liquid components from a mixture of liquids. Undesirable substances which may be separated from a gas include particulate matter, such as solid, gelatinous or liquid particles. Filter assemblies and filter cartridges embodying the invention may be used in any of these applications.

The invention also relates to methods for removing filter cartridges from filter assemblies. A filter assembly may include a reusable filter housing that contains a replaceable filter cartridge sealed within the filter housing by an O-ring seal or any other suitable sealing arrangement. In use, fluid is directed into an inlet of the filter housing through filter cartridge and out through an outlet of the filter housing. In time, the filter cartridge becomes clogged, for example, with particulate matter that is separated from the fluid. The clogged filter cartridge must then be removed and replaced with a new or clean filter cartridge. Filter assemblies, filter cartridges and removal methods embodying the invention greatly facilitate this changeout process.

DISCLOSURE OF THE INVENTION

A filter cartridge may include a filter pack through which the fluid is directed to separate the undesirable substances from the fluid. The filter pack, which may be a pleated structure formed from one or more polymeric materials, preferably has a hollow, cylindrical configuration. Fluid is directed through the hollow, cylindrical filter pack in a generally radial direction either inside out or outside in. To support the filter pack against the force of the fluid flowing through the filter pack, a cylindrical support having openings is positioned closely adjacent to the filter pack. For example, the cylindrical support may be a perforated cage positioned closely adjacent to the exterior of the filter pack. The perforated cage then supports the filter pack against the radially outwardly directed force of fluid flowing inside out through the filter pack and through the perforations in the perforated cage. Alternatively, the cylindrical support may be a perforated core positioned closely adjacent to the interior of the filter pack. The perforated core then supports the filter pack against the radially inwardly directed force of fluid flowing outside in through the filter pack and through the perforations in the core. Occasionally, it is desirable to have both a perforated cage and a perforated core supporting the filter pack. To minimize the amount of waste that is generated in replacing a clogged filter cartridge, the cylindrical support, e.g., the perforated cage or core, may be fashioned as a permanent part of the reusable filter housing rather than a part of the disposable filter cartridge.

For a variety of reasons, a filter cartridge can become lodged within the filter housing, which may make removal of the filter cartridge more difficult. For example, the seal between the filter cartridge and filter housing can stick to the filter housing. This enhanced frictional engagement between the seal and the filter housing can then make it more difficult to slide the filter cartridge out of the filter housing. Further, as fluid flows inside out or outside in through the filter pack, the fluid may force the filter pack tightly against the cylindrical support and press portions of the filter pack into the openings in the cylindrical support, locking the two together. This is a particular problem for filter packs formed substantially from polymeric materials, which can flex and stretch, especially if the fluid flowing through the filter pack is warm. With portions of the filter pack locked into the openings of the cylindrical support, the replaceable filter cartridge can be more difficult to remove from the permanent cylindrical support.

According to one aspect of the invention, a filter assembly may comprise a filter housing, a cylindrical hollow filter cartridge and a linkage. The filter housing includes a fluid inlet and a fluid outlet and defines a fluid flow path between the fluid inlet and the fluid outlet. The filter housing further includes a removable portion and a cylindrical support which has one or more openings. The filter cartridge may be removably positioned in the fluid flow path closely adjacent to the cylindrical support and facing the one or more openings in the cylindrical support. The linkage is engagable between the filter cartridge and the removable portion of the filter housing. The linkage is arranged to rotate and/or axially move the filter cartridge with respect to the cylindrical support in response to removal of the removable portion of the filter housing.

A filter housing can include a cylindrical support having one or more openings and a removable portion having one or more link elements. According to another aspect of the invention, a filter cartridge for use in this filter housing may comprise a cylindrical, hollow, substantially polymeric filter pack and first and second end caps. The filter pack may be configured to fit closely adjacent to the cylindrical support facing the openings in the support. The filter pack has first and second ends, and the first and second end caps are respectively mounted to the first and second ends of the filter pack. At least one of the first and second end caps includes one or more link elements configured to engage the one or more link elements on the removable portion of the filter housing to remove the filter cartridge from the cylindrical support.

According to another aspect of the invention, a filter cartridge may comprise a cylindrical, hollow, substantially polymeric filter pack and first and second end caps. The filter pack has first and second ends, and the first and second end caps are respectively mounted to the first and second ends of the filter pack. At least one of the end caps includes one or more link elements configured to transmit a twisting force and/or an axial force to the end cap. Further, the filter cartridge is free of at least one of a perforated core and a perforated cage.

According to another aspect of the invention, a method for removing a filter cartridge from a filter housing is provided. The method may comprise removing a removable portion of the filter housing which is linked to a cylindrical filter cartridge. Removing the removable portion of the filter housing includes rotating and/or a axially moving a filter cartridge closely adjacent to a stationary cylindrical support having one or more openings facing the filter cartridge. The method further comprises removing the filter cartridge from the stationary support and the filter housing.

Filter assemblies, filter cartridges and removal methods embodying the invention offer many advantages. For example, the replaceable filter cartridge may become lodged within the filter housing with the filter pack pressed into the openings in the reusable cylindrical support and/or an O-ring tightly engaged with the filter housing, locking the two together. However, removal of the filter cartridge from the cylindrical support and the filter housing is nonetheless fast and effective. Removing the removable portion of the filter housing engages the link elements of the linkage and transmits a twisting force and/or an axial force to the filter cartridge. This twisting and/or axial force breaks the filter cartridge free from the filter housing, including the stationary cylindrical support. In many embodiments, the removable portion of the filter housing, e.g., a cover assembly or a header assembly, may be threaded to the remainder of the filter housing, and the removable portion of the filter housing can be unscrewed by a lever, such as a screwdriver or a wrench. This greatly enhances the mechanical advantage available to break the filter cartridge free of the filter housing and the stationary support. Further, the link elements can be configured to transmit both an axial force and a twisting force. Unscrewing the threaded rotatable portion then not only twists the filter cartridge about the stationary support but also pulls the filter cartridge axially along the stationary support.

DESCRIPTION OF THE DRAWINGS

FIG. 4 is an isometric view of a rotatable portion of a filter housing.

FIG. 5 is a sectioned view of a link element for the rotatable portion of FIG. 4.

DETAILED DESCRIPTION EMBODIMENTS

Figure 1:
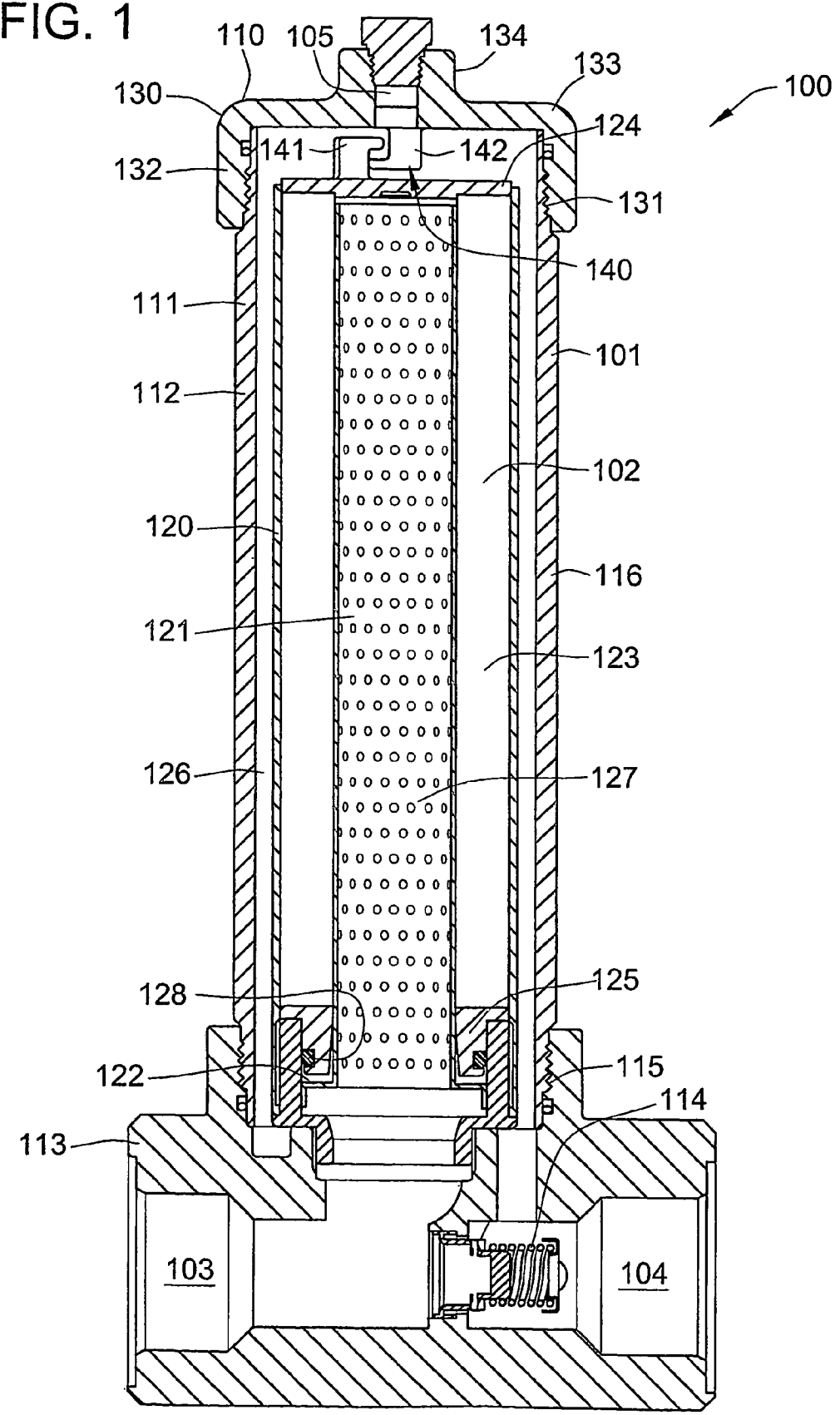
FIG. 1 is a side view of a filter assembly including a filter housing and a filter cartridge.

Filter assemblies embodying the invention may be configured in numerous ways. One example of a filter assembly 100 is shown in FIG. 1. The filter assembly 100 generally comprises a filter housing 101 and a filter cartridge 102. The filter housing 101 may include a fluid inlet 103 and a fluid outlet 104 and define a fluid flow path between the fluid inlet 103 and the fluid outlet 104. The filter cartridge 102 may be sealed in the filter housing 101 across the fluid flow path. The illustrated embodiment of the filter assembly 100 is thus arranged for dead-end filtration, and the fluid outlet 104 is a filtrate outlet. In other embodiments, the filter assembly may, for example, be arranged for cross-flow filtration, and the filter housing may include a fluid inlet and two fluid outlets, i.e., a filtrate or permeate outlet and a retentate or concentrate outlet. The filter housing 101 may include one or more additional ports, e.g., a vent or drain port 105.

The filter housing may have any of a wide variety of configurations and components. In FIG. 1, the filter housing 101 has an elongate, generally cylindrical configuration and generally comprises a removable portion 110 and a remaining portion 111 of the filter housing 101. The remaining portion 111 of the filter housing 101 may comprise a casing assembly 112 and a header assembly 113 sealed to the casing assembly 112. The header assembly 113 may include one or more ports, e.g., the fluid inlet 103 and the filtrate outlet 104, and a bypass valve 114 may be disposed in the header assembly 113 between the fluid inlet 103 and the filtrate outlet 104. The header assembly 113 is preferably removably mounted to one end of the casing assembly 112, for example, by a threaded connection 115, with the fluid inlet 103 and the filtrate outlet 104 fluidly communicating with the interior of the casing assembly 112. The casing assembly 112 may include a generally cylindrical casing 116 which surrounds the filter cartridge 102. In other embodiments, the remaining portion of the filter housing may be configured differently. For example, in some embodiments, the remaining portion of the filter housing may comprise a bowl arrangement which contains the filter cartridge while the removable portion of the filter housing includes the fluid inlet and the fluid outlet.

To support the filter cartridge against the force of the fluid flowing through the filter cartridge, the filter housing may also include one or more cylindrical supports closely circumjacent to the filter cartridge, e.g., along the exterior and/or the interior of the filter cartridge. The filter assembly may include both interior and exterior supports to support the filter cartridge during forward flow and against errant backpulses or against reverse flow cleaning processes. Each cylindrical support has openings which allow fluid to flow to or from the filter cartridge 102. In FIG. 1, the filter housing 101 includes a hollow cage 120 as an exterior cylindrical support and a hollow core 121 as an interior cylindrical support, and both the cage 120 and core 121 have perforations which extend completely through the cage 120 and core 121 as openings in each cylindrical support.

Each cylindrical support is preferably formed from a material, e.g., a metal, such as stainless steel, or an engineering plastic, which has sufficient structural integrity to support the filter cartridge. Further, the cylindrical support is preferably reusable and is preferably mounted to the reusable part of the filter assembly, i.e., the filter housing. In FIG. 1, the perforated cage 120 and the perforated core 121 are both preferably mounted to the remaining portion 111 of the filter housing 101. The perforated cage 120 and core 121 may be permanently or removably connected to the header assembly 113 in any suitable manner. For example, the cage 120 may be threaded to the header assembly 113 and the core 121 may be welded to the header assembly 113 via a collar or a spider 122 or other structure having openings to accommodate the flow of fluid along the interior of the core 121.

Although the cylindrical support of the illustrated embodiment includes both a perforated cage and a perforated core, other embodiments may have different configurations. For example, embodiments may have only a perforated core, especially where flow is normally outside in through the filter cartridge, or only a perforated cage, especially where flow is normally inside out through the filter cartridge. Some embodiments may have neither a perforated core nor a perforated cage. For example, in some embodiments the casing may serve as the cylindrical support. The casing may have openings such as channels on its inner surface which direct fluid to the fluid outlet. The filter cartridge may then be disposed closely circumjacent to the casing and the casing may support the filter cartridge against outward fluid flow, as disclosed, for example, in U.S. Pat. No. 6,110,368, which is incorporated by reference. In any of the embodiments, the cylindrical support is preferably closely adjacent to the filter cartridge, i.e., the cylindrical support may directly contact or be slightly spaced from the filter cartridge, but the cylindrical support is sufficiently close to the filter cartridge to support the filter cartridge against the force of the fluid flowing through the filter cartridge.

The filter cartridge preferably has a hollow, generally cylindrical configuration and may be fashioned in any of a wide variety of ways. In many preferred embodiments, the filter cartridge 102 comprises a filter pack 123 with two ends and two end caps 124, 125 respectively mounted to the ends of the filter pack 123. The filter pack preferably includes a filter medium which separates the undesirable substances from the fluid flowing through the filter pack. The fluid pack may be a non-pleated structure, such as a hollow fibrous mass or a spirally wound structure, or a pleated structure, such as the pleated structure disclosed in U.S. Pat. No. 5,543,047, which is incorporated by reference. The filter pack may comprise a single layer or may be a composite of multiple layers, including, for example, one or more layers of a filter medium and one or more layers of a drainage medium. In many embodiments, all or most of the components of the filter pack are formed from one or more polymeric materials. Alternatively, one or more components of the filter pack may be formed from other materials, including, for example, a fiberglass material or a metallic material. In the illustrated embodiment, the filter pack 123 is preferably hollow and comprises a plurality of pleats extending generally axially along the filter cartridge and formed from one or more polymeric materials. The filter pack 123 may further include a wrap disposed around the crests of the pleats. The wrap may, for example, be a cylindrical sleeve or a helical wrap and is preferably formed from a polymeric material, such as a polymeric mesh.

The end regions of the filter cartridge may be fashioned in a variety of ways. In many preferred embodiments, each end region of the filter cartridge comprises an end of the filter pack bonded to an end cap. In FIG. 1, both ends of the filter pack 123 are mounted to end caps 124, 125. Preferably, one end cap 124 is closed while the other end cap 125 is open. The filter cartridge 102 is positioned between the perforated cage 120 and the perforated core 121 with the open end cap 125 and sealed to the remaining portion 111, e.g., the header assembly 117, of the filter housing 101 by any suitable sealing arrangement. For example, an O-ring seal 128 may be seated between the filter cartridge 102 and the filter housing 101. The filter cartridge 102 thus divides the interior of the filter housing 101 into a fluid chamber 126 communicating with the fluid inlet 103 and a filtrate chamber 127 communicating with the filtrate outlet 104. In other embodiments both end caps may be differently configured, e.g., both may be open. The end caps are preferably formed from an impervious material, e.g., an impervious metal or polymeric material, and preferably have sufficient structural integrity to withstand the twisting and/or axial forces exerted on the end caps. The end caps are mounted to the ends of the filter pack in any suitably reliable manner to both prevent bypass of fluid around the filter pack and to transmit twisting forces, axial forces, or twisting forces and axial forces from the end cap to the filter pack. For example, melt bonding or adhesive or solvent bonding may be used to mount the end caps to the ends of the filter pack.

The removable portion of the filter housing may be configured in a number of different ways to provide an opening through which the filter cartridge may be removed or inserted. For example, the removable portion may be a rotatable portion of the filter housing. In FIG. 1, the rotatable portion 110 of the filter housing 101 preferably comprises a cover assembly 130 which may be removably sealed to the casing assembly 112, for example, at a threaded connection 131. The cover assembly 112 preferably comprises a cylindrical sidewall 132 and an end wall 133. On the outer surface of the end wall 133 a fitting 134 may be located. The fitting 134 is preferably configured to engage a lever (not shown), such as a screwdriver or a wrench, to provide a mechanical advantage in screwing or unscrewing the casing assembly 130. In FIG. 1, the fitting has a preferably configuration which fits a wrench.

While the rotatable portion of the filter housing preferably comprises a cover assembly 130 in FIG. 1, the rotatable portion may be differently configured in other embodiments.

For example, the rotatable portion of the filter housing may comprise a header assembly or any other fitting arrangement which may be connected to and rotated with respect to the remaining portion of the filter housing. The rotatable portion of the filter housing is preferably large enough to allow the filter cartridge to be removed from the filter housing when the rotatable portion is removed from the filter housing. For example, the cover assembly 130 has a larger diameter than the filter cartridge 102, allowing the filter cartridge 102 to be removed when the cover assembly 130 is removed.

The rotatable portion of the filter housing may be connected to the remaining portion in any suitable manner which allows rotation of the rotatable portion with respect to the remaining portion of the filter housing. For example, the rotatable portion may be connected to the remaining portion of the filter housing by connectors, such as screws or bolts, which allow the rotatable portion of the filter housing to be rotated after the connectors are loosened or removed, or by a fitting, such as a bayonette-type fitting. In many preferred embodiments, the rotatable portion of the filter housing is connected to the remaining portion by a threaded connection which allows the rotating portion to be screwed onto and unscrewed from the remaining portion of the filter housing. With a threaded connection, the rotatable portion both rotates and translates axially as it is screwed onto and unscrewed from the remaining portion.

The filter assembly 100 further comprises a linkage 140 which is engagable between the removable portion 110 of the filter housing 101 and the filter cartridge 102. In many preferred embodiments, the linkage 140 may be arranged to at least rotate the filter cartridge 102, and, more preferably, rotate and axially translate the filter cartridge 102, in response to removal of the removable portion 110 of the filter housing 101. For example, the linkage 140 may be configured to transmit at least twisting forces, or torque, between the rotatable portion 110 of the filter housing 101 and the filter cartridge 102. More preferably, the linkage 140 is configured to transmit both twisting forces, or torque, and axial forces between the rotatable portion 110 of the filter housing 101 and the filter cartridge 102 in response to rotation of the rotatable portion 110.

Figure 2:
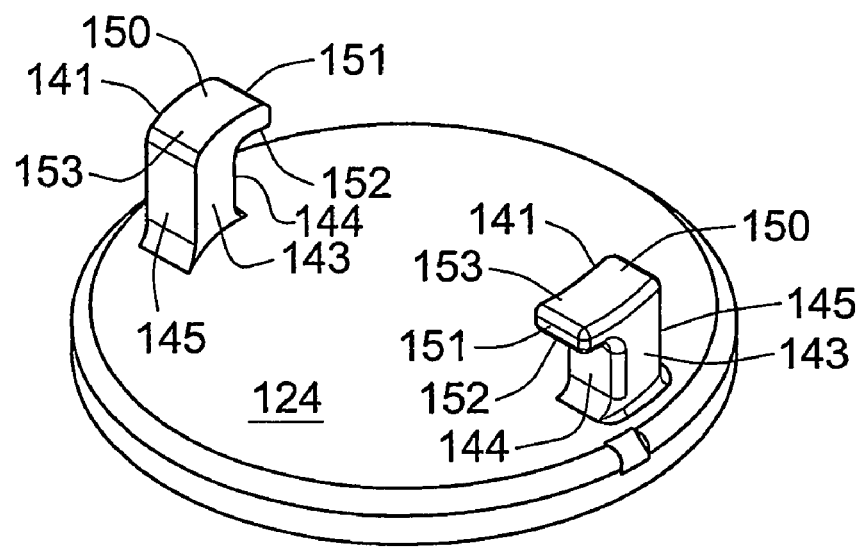
FIG. 2 is an isometric view of an end cap.

The linkage may be configured in a variety of ways. In FIG. 1 and FIG. 2, the linkage 140 comprises one or more link elements 141 operatively associated with the filter cartridge 102, e.g., the end region of the filter cartridge 102, and one or more link elements 142 operatively associated with the removable portion 110, e.g., the cover assembly 130, of the filter housing 101. The link elements 141, 142 may have any number of suitable configurations. For example, the link elements 141, 142 preferably comprise protrusions on and/or indentations in the filter cartridge 102 and the removable portion 110 of the filter housing 101. The link elements 141, 142 may be structured to extend in the axial, radial and/or theta directions of a standard cylindrical coordinate system to transmit only twisting forces, or torque, once the link elements 141, 142 are engaged or, more preferably, to transmit both twisting forces, or torque, and axial forces once the link elements 141, 142 are engaged.

In FIG. 1 and FIG. 2, the link elements 141 of the filter cartridge 102 preferably comprise at least one link element 141 and, preferably two or more link elements 141 angularly spaced from one another. Most preferably, two diametrically-opposed, generally identical protrusions 141 project from the end face of the blind end cap 125 away from the filter pack 123 near the outer edge of the end cap 125. The protruding link elements 141 may be configured in numerous ways. For example, they may be configured as axially extending posts, e.g., square posts, which upon engagement with the link elements of the rotatable portion of the filter housing would transmit twisting forces or torque.

Preferably, the protruding link elements 141 of the filter cartridge 102 are configured as hooks, e.g., they have a generally L-shaped configuration. The hook shaped link elements 141 may each include a generally axially extending post 143 having a front region 144 and a back region 145. Each link element 141 may further include an extension 150 which preferably extends generally in the theta direction at about 90°, e.g., slightly less than 90°, from the end of the post 143. The extension 150 may include: an edge 151, a lower region 152 and an upper region 153.

The link elements 142 of the removable portion 110 of the filter housing 101 may. be configured very similarly to the link elements 141 of the filter cartridge 102. Thus, the link elements 142 of the rotatable portion 110 preferably comprise two diametrically-opposed, generally identical, L-shaped protrusions 142, diametrically spaced the same distance, and located on the same center, as the link elements 141 of the filter cartridge 102. The link elements 141, 142 are preferably sized and oriented such that when the filter cartridge 102 is fully inserted in the remaining portion 111 of the filter housing 101 adjacent to the cylindrical support 120, 121 and the rotatable portion 110 is fully fitted to the remaining portion 111 of the filter housing 101, the link elements 141, 142 can engage one another along the back regions 145 of the posts 143 with the extensions ISO of the link elements 141, 142 pointing away from one another. The filter cartridge 102 may then be rotated in one direction with respect to the cage 120 and core 121 by rotation of the rotatable portion 110 of the filter housing 101 in that direction. Preferably, in this fully inserted/fully fitted position, the lower region 152 of each extension 150 of the cover assembly link elements 142 may be slightly spaced from, or more preferably, may contact, the end face of the end cap 124. Alternatively or additionally, the upper region 153 of each extension 150 of the filter cartridge link elements 141 may be spaced from, or preferably, may contact, the bottom of the end wall 133 of the cover assembly 130.

The link elements 141, 142 are also preferably sized and oriented such that after one or less revolution of the cover assembly 130 in the opposite direction, the link elements 141, 142 can engage one another along the front regions 144 of the posts 143, e.g., with the edges 151 of the extensions 150 facing and, preferably, contacting the front regions 144 of the posts 143. The filter cartridge 102 may then be rotated in the opposite direction with respect to the cage 120 and core 121 by rotation of the rotatable portion 110 of the filter housing 101 in that direction. The extensions 150 of the cover assembly link elements 142 preferably lie between the end face of the end cap 124 and the extensions 150 of the filter cartridge link elements 141, while the extension 150 of the filter cartridge link elements 141 preferably lie between the end wall 133 of the cover assembly 130 and the extensions 150 of the cover assembly link elements 142. Further, the spacing between the overlapping extensions 150 of the link elements 141, 142 and the length of the threads 131 are preferably such that additional revolutions of the cover assembly 130 will close the gap between the extensions 150 of the link elements 141, 142, allowing them to contact one another. Further revolutions will cause the extension 150 on the link elements 142 of the rotatable portion 110 of the filter housing 101 to lift the extensions 150 on the link elements 141 of the filter cartridge 102 and at least slightly slide the filter cartridge 102 axially along the cage 120 and core 121.

In a preferred mode of operation, the filter cartridge 102 may be removed from the filter housing 101 by removing the removable portion 110 of the filter housing 101 while linked to the filter cartridge 102. For example, rotating the rotatable portion 110 with the link elements 141, 142 engaged also rotates the filter cartridge 102 with respect to the stationary cylindrical support 120, 121, breaking the filter cartridge 102 free of the remaining portion 111 of the filter housing 101, e.g., breaking the filter pack 123 free of the cylindrical support 120, 121 and/or the O-ring 128 free of the filter housing 101. The filter cartridge 102 may then be removed from the stationary support 120, 121 and the filter housing 101.

In the FIG. 1 embodiment, a lever, such as the wrench, may be applied to the fitting 134 on the cover assembly 130, providing significant mechanical advantage in unscrewing the cover assembly 130 from the casing assembly 112 of the filter housing 101. Rotating the cover assembly 130 in this fashion engages the link elements 141, 142 as shown in FIG. 1. There may be some lost motion before the link elements 142 of the rotating cover assembly 130 engage the link elements 141 of the filter cartridge 102, e.g., before the edges 153 of the extensions 150 engage the front regions 144 of the posts 143. However, once the link elements 141, 142 are engaged, the edges 151 of the extensions 150 of the link elements 141, 142 may push against the posts 143, transmitting the twisting forces, or torque, applied by the lever on the cover assembly 130 to the filter cartridge 102. The filter cartridge 102 is thus forced to rotate within the stationary perforated cage 120 and core 121, breaking the filter pack 123 free of the perforations in the cage 120 and core 121 and/or the O-ring 128 free of the filter housing 101.

Further rotation of the cover assembly 130 within the threaded connection 131 lifts the extensions 150 on the cover assembly link elements 142 into engagement with the extensions 150 on the filter cartridge link elements 141. Again, there may be some lost motion before the upper regions 153 of the cover assembly link elements 142 engage the lower regions 152 of the filter cartridge link elements 141. However, once the link elements 141, 142 are thus engaged, the extensions 150 of the cover assembly link elements 142 lift against the extensions 150 of the filter cartridge link elements 141, lifting the filter cartridge 102 along the perforated cage 120 and core 121. Once the cover assembly 130 is completely unscrewed from the casing assembly 112, the filter cartridge 102 is broken free of the remaining portion 111 of the filter housing 101, including the perforated cage 120 and core 121, and the "hooked" link elements may allow the filter cartridge 102 to simply be lifted from between the cage 120 and core 121 and out of the filter housing 101 by lifting the cover assembly 130 away from the casing assembly 112.

To replace the filter cartridge, a new or cleaned filter cartridge may be inserted along the cylindrical support with the filter cartridge facing the openings in the cylindrical support. In FIG. 1, a replacement filter cartridge 102 may be inserted, preferably fully inserted, between the cage 120 and the core 121. The cover assembly 130 may then be screwed onto the casing assembly 112. As the cover assembly 130 threads onto the casing assembly 112, the cover assembly link elements 142 will rotate and translate axially toward the end region of the filter cartridge 102 and the filter cartridge link elements 141. Initially, the lower regions 152 of the extensions 150 of the cover assembly link elements 142 may contact and slide off of the upper regions 153 of the extensions 150 of the filter cartridge link elements 141. With further revolution, the back regions 145 of the posts 143 will contact one another and the filter cartridge 102 will rotate between the cage 120 and the core 121. As the cover assembly 130 is fully tightened onto the casing assembly 112, the lower regions 152 of the cover assembly link elements 142 may contact, or be slightly spaced from, the end face of the end cap 124. The filter cartridge 102 may thus be properly maintained in position between the cage 120 and the core 121 sealed to the remaining portion 111 of the filter housing 101.

While various aspects of the invention have been described and illustrated with respect to the embodiment shown in FIGS. 1 and 2, the invention is not limited to this embodiment. For instance, one or more of the features of the embodiment shown in FIGS. 1 and 2 may be eliminated without departing from the scope of the invention. For example, the perforated core 121 may be eliminated. As another example the extensions 150 on the link elements may be eliminated. The link elements may then transmit twisting forces or torque between the rotating portion of the filter housing and the filer cartridge without transmitting axial forces to lift the filter cartridge from the cylindrical support. The twisting forces would break the filter cartridge free of the filter housing including the cylindrical support. However, removing the rotatable portion of the filter housing may not remove the filter cartridge. A handle or a pull-tab may be provided on the end of the filter cartridge, allowing the filter cartridge to be lifted from the remaining portion of the filter housing after it has been broken free.

Further, one or more of the features of the embodiment shown in FIGS. 1 and 2 may be modified without departing from the scope of the invention. For example, the header assembly may be the removable, e.g., rotatable, portion of the housing and may have the link elements, or the open end cap may have the corresponding filter cartridge link elements. As another example, the extensions 150 of the set of link elements on the rotatable portion of the filter housing, or on the filter cartridge, may point radially inwardly or outwardly, and the posts and extensions of the other set of link elements may be positioned to engage the radial extensions. As yet another example, the link elements on the rotatable portion of the filter housing or on the filter cartridge need not be identical to one another or similar to the corresponding set of link elements.

Figure 3:
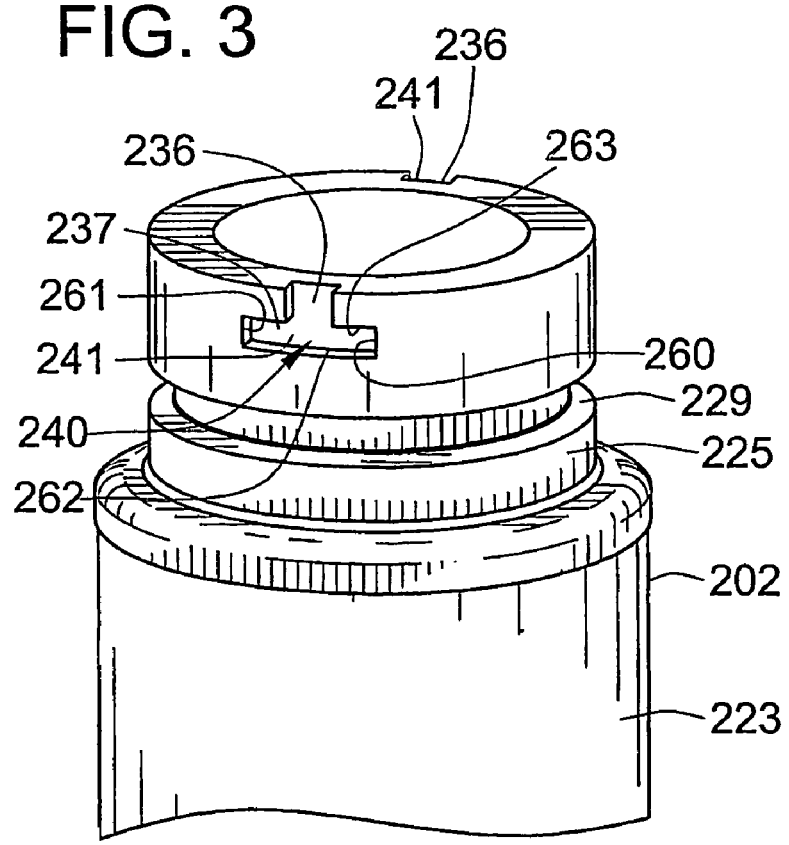
FIG. 3 is an isometric view of an end region of a filter cartridge.

Further, embodiments having very different features can still be within the scope of the invention. For example, as shown in FIGS. 3-5, a filter assembly 200 may include a header assembly 213 as the removable portion 210 of the filter housing 201. The header assembly 213 may be connected to the remaining portion (not shown) of the filter housing 201 in any suitable manner. For example, the header assembly 213 may be a rotatable portion 210 of the filter housing 201 and may be connected to the remaining portion of the filter housing by a threaded connection 215 at the end wall 233 of the header assembly 213. One or more inlet ports 203 may direct fluid to the interior of a filter cartridge 202 through an open end cap 225. The open end cap 225 may be sealed to the interior surface of a collar 217 at the end of the header assembly 213 opposite the end wall 233, e.g., by an O-ring (not shown) seated between a groove 229 in the open end cap 225 and the interior surface of the collar 217. The filter cartridge 202 is also positioned closely adjacent to a cylindrical support (not shown) which may be attached to the remaining portion of the filter housing. The filter cartridge 202 faces the openings in the cylindrical support.

The linkage 240 between the rotatable portion 210 of the filter housing 201 and the filter cartridge 202 preferably includes link elements 241, 242 which are capable of transmitting at least twisting forces, or torque, and, more preferably, both twisting forces and axial forces, between the rotatable portion 210 of the filter housing 201 and the filter cartridge 202. The link elements may be variously configured, e.g., as protrusions or indentations. In FIGS. 3-5, the header assembly link elements 242 preferably comprise one or more protrusions such as posts which extend radially inwardly from the rotatable portion 210 of the filter housing 201. For example, the link elements 242 may comprise two diametrically opposed circular posts 243 which extend radially inwardly from the collar 217 of the header assembly 213.

The link elements 241 on the filter cartridge 202 preferably comprise one or more indentations, and the indentations may be configured in a variety of ways. In FIG. 3, two diametrically opposed indentations 241 are disposed in an end region of the filter cartridge, e.g., radially into the exterior of the side wall of the open end cap 225, preferably without extending completely through the side wall. The indentations 241 may have an inverted T shape, including an axially extending channel 236 which intersects a channel 237 extending in the theta direction. Each theta channel 237 includes a front region 260, a back region 261, a lower region 262, and an upper region 263. The link elements 241, 242 are sized and oriented such that in the fully inserted/fully fitted position, the posts 243 fit within the theta channels 237, preferably contacting the lower region 262 of the theta channel 237.

To remove a spent filter cartridge 202, the header assembly 213 may be unscrewed, preferably by inserting a lever such as a screw driver in a notch 234 in the header assembly 213. Rotating the header assembly 213 in this fashion engages the link elements 241, 242. Once engaged, the posts 243 bear against the front regions 260 of the theta channels 237 of the open end cap 225, transmitting the twisting forces, or torque, applied by the lever on the header assembly 213 to the filter cartridge 202. The filter cartridge 202 is thus forced to rotate with respect to the remaining portion of the filter housing, including the cylindrical support, breaking the filter cartridge 202 free, e.g., breaking the filter pack 223 free of the openings in the cylindrical support and/or loosening the frictional engagement of the O-ring with the interior surface of the collar 217.

Further rotation of the header assembly 213 in the threaded connection 215 lifts the posts 243 into engagement with the upper regions 263 of the theta channels 237. Once engaged in this fashion, the posts 243 lift against the end cap 225, lifting the filter cartridge 202 along the cylindrical support. Once the header assembly 213 is completely unscrewed from the remaining portion of the filter housing, the filter cartridge 202 may simply lifted from the cylindrical support and out of the filter housing by lifting the header assembly 213 away from the remaining portion of the filter housing. The filter cartridge 202 may be removed from the header assembly 213 by twisting the filter cartridge 202 until the posts 243 align with the axial channels 236 in the end cap 225 and then pulling the filter cartridge 202 free of the header assembly 213.

To install a new or clean filter cartridge 202, the posts 243 of the header assembly 243 are preferably aligned with the axial channels 236 in the filter cartridge 202. The filter cartridge 202 may then be pushed and twisted onto the rotatable portion 210 of the filter housing 101, allowing the posts 243 to lie within the theta channel 237 spaced from the axial channel 236. The filter cartridge 202 may then be aligned with the cylindrical support, and the header assembly 213 and filter cartridge 202 together may be lowered onto the remaining portion of the filter assembly, with the filter cartridge 202 sliding axially along the cylindrical support. Once the header assembly 213 engages the threaded connection 215, it may be tightened into position by a lever fitted to the notch 234. Screwing the header assembly 213 onto the remaining portion of the filter housing causes the posts 243 to press against the back region 261 and the lower region 262 of the theta channel 237, twisting and lowering the filter cartridge 202 into the fully installed position on the cylindrical support in the remaining portion of the filter housing.

While previous embodiments transmitted a twisting force, or both a twisting force and an axial force, via the linkage, embodiments which transmit an axial force via the linkage without transmitting a twisting force can also be within the scope of the invention. One example of a filter assembly having a linkage which transmits an axial force without transmitting a twisting force may be similar to the filter assembly 100 shown in FIG. 1. The filter housing may include a rotatable portion, e.g., a cover assembly, which is threaded directly to the remaining portion of the filter housing. Alternatively, the removable portion of the filter housing may not rotate when it is mounted or removed from the remaining portion of the filter housing. For example, the removable portion and the remaining portion may be coupled to one another by a threaded collar or a threaded post which jacks the removable portion axially on or off the remaining portion of the filter housing without rotating the removable portion.

A linkage which transmits an axial force from the removable portion of the filter housing to the filter cartridge may be configured in numerous ways and preferably includes link elements such as protrusions and/or indentations. One example of the linkage 340, shown in FIG. 6, preferably comprises one or more link elements 341 on an end region of the filter cartridge 302 and one or more link elements 342 on the removable portion of the filter housing (not shown) which are capable of engaging the filter cartridge link element 341. The filter cartridge link element 341 preferably comprises a circular channel 337 formed in an end cap, e.g., in the end face of a blind end cap 324. The base of the channel 337 may define a lower region 362. The channel 337 preferably includes an undercut region 338 on the inner circumference or outer circumference of the channel 337, defining an upper region within the channel 337. The link elements 342 of the removable portion of the filter housing preferably comprise one or more, e.g., two, hook shaped, e.g., L-shaped, protrusions. Each L-shaped protrusion 342 may include an axially extending leg 343 and a radially extending leg 350 configured to hook under the upper region 363 of the circular channel 337. The radially extending leg 350 has a lower region 352 and an upper region 353.

In a preferred mode of operation, the removable portion of the filter housing may be removed, and the filter cartridge 302 may be inserted, preferably fully inserted, into the remaining portion of the filter housing along the cylindrical support, e.g., axially along the perforated cage 320 and/or core (not shown). The removable portion of the filter housing may then be mounted to the remaining portion, e.g., by rotating and/or lowering it onto the remaining portion, while the link elements 341, 342 engage one another.

Figure 6:
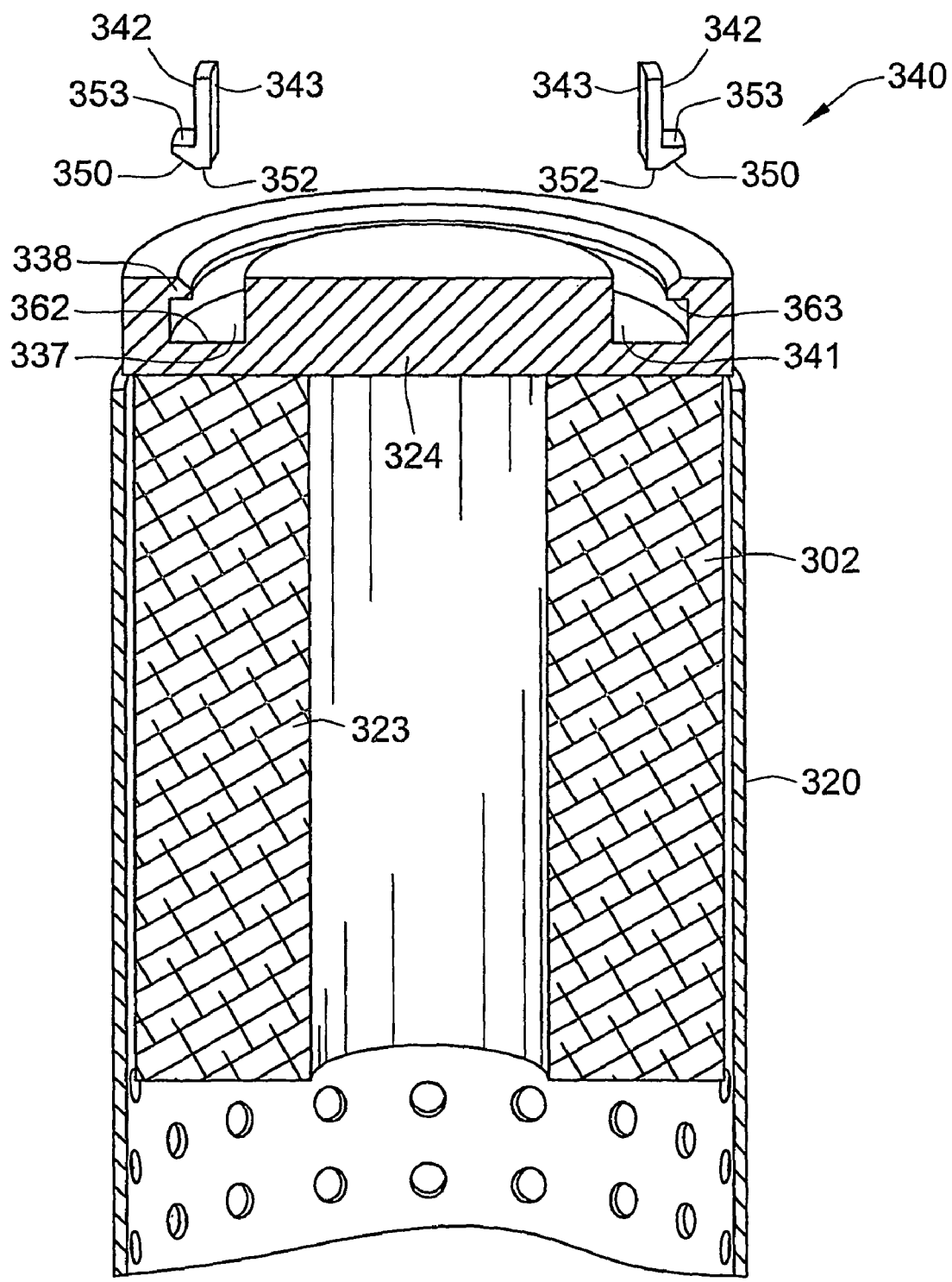
FIG. 6 is a sectioned isometric view of another linkage.

For example, in FIG. 6, the link elements 341, 342 are sized and oriented such that the radial legs 350 of the removable portion link elements 342 lie along approximately the same diameter as the undercut region 338 of the channel 337 in the end cap 324 of filter cartridge 302. Further, the top surface of the undercut region 338 of the channel 337 and the lower region 352 of the radial legs 350 preferably have cooperating bevels. As the removable portion of the filter housing is mounted to the remaining portion, the bevels of lower regions 352 of the radial legs 350 and the top surface of the undercut region 338 of the channel 337 contact one another. The axial legs 343 are preferably flexible and flex radially outwardly or inwardly as the bevels slide along one another. Once the radial legs 350 are below the undercut region 338, the axial legs 350 return to an axial orientation, and the upper regions 353 of the radial legs 350 snap under the upper region 363 of the channel 337. The link elements 341, 342 are preferably sized and oriented such that once the removable portion of the filter housing is fully fitted to the remaining portion, the lower regions 352 of the removable portion link elements 342 contact, or are slightly spaced from, the lower region 362 of the channel 337. The filter cartridge 302 may thus be properly maintained in position sealed to the remaining portion of the filter hosing and closely adjacent to the cylindrical support 320.

Alternatively, the filter cartridge 302 may be snap fitted to the removable portion of the filter housing before mounting the removable portion to the remaining portion of the filter housing. With the L-shaped link elements 342 disposed in the channel 337 and the filter cartridge 302 attached to the removable portion of the filter housing, the filter cartridge 302 may be aligned with the cylindrical support 320. The filter cartridge 302 and the removable portion together may be axially lowered onto the remaining portion of the filter housing, with the filter cartridge 302 sliding axially along the cylindrical support 320. The lower regions 352 of the L-shaped link elements 342 on the removable portion press against the lower region 362 of the channel 337 in the end cap 324 of the filter cartridge 302, transmitting axial forces from the removable portion of the filter housing to the filter cartridge 302. However, rotation of the removable portion preferably causes the L-shaped link elements 342 to rotate within the channel 337 without transmitting twisting forces or torque to the filter cartridge 302. Fully fitting the removable portion to the remaining portion of the filter housing fully inserts the filter cartridge 302 into the remaining portion along the cylindrical support 320.

To remove a spent filter cartridge 302, the removable portion of the filter housing is removed from the remaining portion of the filter housing. Rotation of the removable portion can rotate the L-shaped link elements 342 within the channel 337 of the filter cartridge 302 without transmitting twisting forces or torque to the filter cartridge 302. However, axial movement of the removable portion lifts the radial legs 350 of the L-shaped link elements 342 within the channel 337. There may be some lost motion before the upper regions 353 of the L-shaped link elements 342 contact the upper region 363 of the channel 337. However, once the upper regions 353, 363 are engaged, further axial movement of the rotatable portion of the filter housing transmits axial force from the removable portion to the filter cartridge 302, breaking the filter pack 323 free of the openings in the cylindrical support 320 and overcoming the frictional engagement between the O-ring and the filter housing. The filter cartridge 302 may then be removed by pulling it free of the cylindrical support 320 and/or the remaining portion of the filter housing.

Embodiments which transmit axial force without transmitting twisting force are not limited to the linkage 340 shown in FIG. 6. For example, a protrusion which encircles the end face of the end caps and which has a radial lip may be substituted for the channel 337. Alternatively, a linkage similar to the linkage 240 shown in FIGS. 3-5, but with the theta channel extending completely around the side of the end cap, may be used.

The present invention is thus not restricted to the particular embodiments which are described and illustrated but includes all embodiments and modifications that may fall within the scope of the claims.

The invention claimed is:

1. A filter assembly comprising:
a filter housing including at least a fluid inlet and a filtrate outlet and defining a fluid flow path between the fluid inlet and the filtrate outlet, wherein the filter housing further includes a removable portion and a cylindrical cage having perforations through the cage;
a cylindrical, hollow filter cartridge removably positioned in the housing in the fluid flow path, the filter cartridge being positioned within and closely adjacent to the cylindrical cage facing the perforations; and
a linkage which includes link elements on the filter cartridge and the filter housing arranged to engage and to rotate the filter cartridge with respect to the cylindrical cage in response to removal of the removable portion of the filter housing, the engaged link elements exerting a twisting force between the filter cartridge and the cage.

2. The filter assembly of claim 1 wherein the filter housing further includes a remaining portion, the removable portion of the filter housing comprising a rotatable portion removably attached to the remaining portion of the filter housing, wherein the link element on the filter cartridge includes first and second angularly spaced protrusions extending axially from one end of the filter cartridge, and wherein the link element on the filter housing includes first and second angularly spaced protrusions extending from the housing.

3. The filter assembly of claim 2 wherein the rotatable portion is threaded to the remaining portion of the filter housing.

4. The filter assembly of claim 2 wherein the removable portion of filter housing includes a header assembly.

5. The filter assembly of claim 2 wherein the perforated cage is mounted to the remaining portion of the filter housing.

6. The filter assembly of claim 2 wherein the filter cartridge is free of a perforated core.

7. The filter assembly of claim 2 wherein the filter housing further includes a perforated core arranged to fit within the interior of the hollow filter cartridge.

8. The filter assembly of claim 2 wherein one or more link elements are operatively associated with the removable portion of the filter housing and one or more link elements are operatively associated with the filter cartridge.

9. The filter assembly of claim 2 wherein the link elements of the filter cartridge each comprise a post.

10. The filter assembly of claim 2 wherein the link elements of the filter cartridge each comprise a square post.

11. The filter assembly of claim 2 wherein the filter cartridge has an end cap and each link element is positioned on the end cap of the filter cartridge.

12. The filter assembly of claim 2 wherein the end cap is a blind end cap.

13. The filter assembly of claim 12 wherein the end cap is an open end cap.

14. The filter assembly of claim 2 wherein the filter cartridge includes a filter pack comprising one or more polymeric materials.

15. The filter assembly of claim 2 wherein the link elements are configured to transmit an axial force between the filter cartridge and the cage.

16. The filter assembly of claim 2 wherein at least one of the link elements comprises a protrusion having a hook-shaped configuration.

17. A filter cartridge for a filter housing including a cylindrical cage having one or more perforations and further including one or more link elements, the filter cartridge comprising a cylindrical, hollow filter pack configured to fit closely adjacent to the cylindrical cage facing the perforations, the filter pack having first and second ends, and first and second end caps mounted to the first and second ends of the filter pack, at least one of the first and second end caps including link elements, wherein the link elements comprise first and second angularly spaced posts that extend axially from the at least one end cap, the link elements being configured to engage the one or more link elements on the filter housing and exert a twisting force on the filter cartridge within the perforated cage to break the filter cartridge free of the perforated cage.

18. The filter cartridge of claim 17 wherein each filter cartridge link element comprises a square post extending from the end cap.

19. The filter cartridge of claim 17 wherein each filter cartridge link element comprises a generally L-shaped protrusion including the post and a extension extending from an end of the post.

20. The filter cartridge of claim 17 wherein the first link element and the second link element are diametrically opposed.

21. A method for removing a filter cartridge from a filter housing comprising:
removing a removable portion of the filter housing from a remaining portion of the filter housing, including rotating the removable portion;
engaging one or more link elements on the filter housing and one or more link elements on the filter cartridge in response to rotating the removable portion of the filter housing, wherein engaging the link elements includes exerting a twisting force between a perforated cage attached to the filter housing and the filter cartridge positioned within and closely adjacent to the perforated cage to break the filter cartridge free of the perforated cage; and
removing the filter cartridge from the filter housing.

22. The method of claim 21 wherein removing the filter cartridge includes axially sliding the filter cartridge along the perforated cage.

23. The method of claim 21 wherein engaging the link elements further includes exerting an axial force between the perforated cage and the filter cartridge within the perforated cage.

24. The method of claim 21 wherein removing the removable portion of the filter housing includes unscrewing the removable portion of the filter housing from the remainder of the filter housing.

* * * * *